US012643967B2

(12) United States Patent
Gadgil

(10) Patent No.: US 12,643,967 B2
(45) Date of Patent: Jun. 2, 2026

(54) DOPANT COMPLEX AND AN ELECTRONIC COMPONENT

(71) Applicant: CANATU FINLAND OY, Vantaa (FI)

(72) Inventor: Bhushan Gadgil, Helsinki (FI)

(73) Assignee: CANATU FINLAND OY, Vantaa (FI)

( * ) Notice: Subject to any disclaimer, the term of this patent is extended or adjusted under 35 U.S.C. 154(b) by 83 days.

(21) Appl. No.: 18/273,937

(22) PCT Filed: Mar. 23, 2022

(86) PCT No.: PCT/FI2022/050188
§ 371 (c)(1),
(2) Date: Jul. 24, 2023

(87) PCT Pub. No.: WO2022/200688
PCT Pub. Date: Sep. 29, 2022

(65) Prior Publication Data
US 2024/0082844 A1      Mar. 14, 2024

(30) Foreign Application Priority Data

Mar. 23, 2021    (FI) ...................................... 20215322

(51) Int. Cl.
C08F 220/14          (2006.01)
C08F 212/14          (2006.01)
(Continued)

(52) U.S. Cl.
CPC .......... C08F 220/14 (2013.01); C08F 212/24 (2020.02); C08K 3/16 (2013.01);
(Continued)

(58) Field of Classification Search
CPC .......... C08K 3/30; C08K 3/2272; C08K 5/42; C08F 12/24; C08F 212/24; H10K 85/30
(Continued)

(56) References Cited

U.S. PATENT DOCUMENTS 5,206,756  A  *  4/1993  Cheshire  ............... G02F 1/1525
                                                              252/62.2
2003/0170546  A1      9/2003  Boon et al.
(Continued)

FOREIGN PATENT DOCUMENTS

EP            1555550  A1      7/2005
JP        H01309205  A      12/1989
(Continued)

OTHER PUBLICATIONS

Tamilselvi "Investigation of Nanocomposite Polymer Electrolytes for Lithium Ion Batteries." Polymer Science, Series A, 2018, vol. 60, No. 1, pp. 102-109 (Year: 2018).*
(Continued)

*Primary Examiner* — Tri V Nguyen
(74) *Attorney, Agent, or Firm* — Robert P. Michal, Esq.; Rimôn PC

(57) ABSTRACT

A dopant complex is disclosed. The dopant complex may be formed of a dopant ion component encapsulated in a polymer matrix, wherein the dopant ion component is a metal triflate, a metal halide, a metal antimonate, or any combination thereof, and the polymer matrix comprises or consists of a hydroxyl-containing polymer. Further is disclosed an electronic component and the use of the dopant complex.

12 Claims, 2 Drawing Sheets

(51) Int. Cl.
    *C08K 3/16*          (2006.01)
    *C08K 5/42*          (2006.01)
    *B01L 3/00*          (2006.01)

(52) U.S. Cl.
    CPC ................ *C08K 5/42* (2013.01); *B01L 3/508*
        (2013.01); *B01L 2200/12* (2013.01); *B01L*
        *2300/0645* (2013.01); *B01L 2300/16* (2013.01)

(58) Field of Classification Search
    USPC ................................................... 252/519.21
    See application file for complete search history.

(56) References Cited

U.S. PATENT DOCUMENTS

| | | | |
|---|---|---|---|
| 2008/0265414 | A1 | 10/2008 | Ho et al. |
| 2013/0022811 | A1* | 1/2013 | Ahn ................... C23C 16/0272 |
| | | | 977/734 |
| 2014/0087164 | A1* | 3/2014 | LeMieux ................ H01B 1/04 |
| | | | 977/734 |
| 2018/0201800 | A1 | 7/2018 | Wang et al. |
| 2021/0002505 | A1 | 1/2021 | Yu et al. |
| 2021/0061958 | A1* | 3/2021 | Ahamed ................ C08L 83/08 |

FOREIGN PATENT DOCUMENTS

| | | | | |
|---|---|---|---|---|
| JP | H1152602 | A | * | 2/1999 |
| JP | 2001005206 | A | | 1/2001 |
| JP | 2002062675 | A | | 2/2002 |
| JP | 2016045459 | A | | 4/2016 |
| KR | 20040046043 | A | | 6/2004 |
| WO | 2008057615 | A2 | | 5/2008 |
| WO | 2008057615 | A3 | | 5/2008 |
| WO | 2008065696 | A1 | | 6/2008 |
| WO | 2009152146 | A1 | | 12/2009 |
| WO | 2014047219 | A1 | | 3/2014 |
| WO | 2014050539 | A1 | | 4/2014 |

OTHER PUBLICATIONS

Translation JPH1152602A (Year: 1999).*
Kim "Structure and Coordination Properties of Facilitated Olefin Transport Membranes Consisting of Crosslinked Poly(vinyl alcohol) and Silver Hexafluoroantimonate." Polymer Physics vol. 42, Issue4, p. 621-628 (Year: 2004).*
International Search Report for International Patent Application No. PCT/FI2022/050188, dated Jun. 23, 2022 (4 pages).
Written Opinion of the International Searching Authority for International Patent Application No. PCT/FI2022/050188 dated Jun. 23, 2022 (6 pages).
Finnish Search Report for Application No. 20215322 (2 pages).
Notification of Transmittal of the International Preliminary Report on Patentability for PCT/FI2022/050188 dated Feb. 15, 2023 (13 pages).
Chinese Office Action and Search Report issued in corresponding application No. 202280008319.1 dated May 28, 2025, together with English language translation.
Japanese Office Action issued in corresponding application No. 2023-541840 dated Jun. 17, 2025 together with English language translation.
Notice of Reasons for Rejection issued by the Japanese Patent Office in relation to Japanese Application No. 2023-541840 dated Dec. 25, 2025 (4 pages) along with English language translation (5 pages).

* cited by examiner

DOPANT COMPLEX AND AN ELECTRONIC COMPONENT

CROSS-REFERENCE TO RELATED APPLICATIONS

This application is a National Stage Application of PCT/FI2022/050188, filed 23 Mar. 2022, which claims benefit of Serial No. 20215322, filed on 23 Mar. 2021 in Finland, and which applications are hereby incorporated by reference in their entireties. To the extent appropriate, a claim of priority is made to each of the above disclosed applications.

TECHNICAL FIELD

The present disclosure relates to a dopant complex. The present disclosure further relates to an electronic component. The present disclosure further relates to the use of a dopant complex.

BACKGROUND

An electronic component for different applications usually comprises a layer of conductor material on a substrate. The conductor material may be sensitive to the surrounding environment, whereby protection thereof may be needed. A dopant layer may be formed on the conductor material to protect the same from the effect of e.g. humidity, moisture, and temperature. The inventor has recognized the need for a dopant that is compatible with conductor material while simultaneously being thermally stable and protective to avoid aging of the electronic component.

SUMMARY

A dopant complex is disclosed. The dopant complex is formed of a dopant ion component encapsulated in a polymer matrix, wherein the dopant ion component is a metal triflate, a metal antimonate, or any combination thereof, and the polymer matrix comprises or consists of hydroxyl-containing polymer.

Further, an electronic component is disclosed. The electronic component comprises a transparent layer comprising transparent conductor material in direct contact with a dopant layer. The dopant layer is formed of a dopant complex formed of a dopant ion component encapsulated in a polymer matrix, wherein the dopant ion component is a metal triflate, a metal antimonate, or any combination thereof, and the polymer matrix comprises or consists of hydroxyl-containing polymer.

Further is disclosed the use of the dopant complex formed of a dopant ion component encapsulated in a polymer matrix, for improving the aging resistance of an electronic component comprising a transparent layer comprising transparent conductor material in direct contact with a dopant layer, by covering the transparent layer comprising transparent conductor material by the dopant layer formed of the dopant complex, wherein the dopant ion component is a metal triflate, a metal antimonate, or any combination thereof, and the polymer matrix comprises or consists of hydroxyl-containing polymer.

BRIEF DESCRIPTION OF THE DRAWINGS

The accompanying drawings, which are included to provide a further understanding of the embodiments and constitute a part of this specification, illustrate various embodiments. In the drawings.

DETAILED DESCRIPTION

Figure 1:
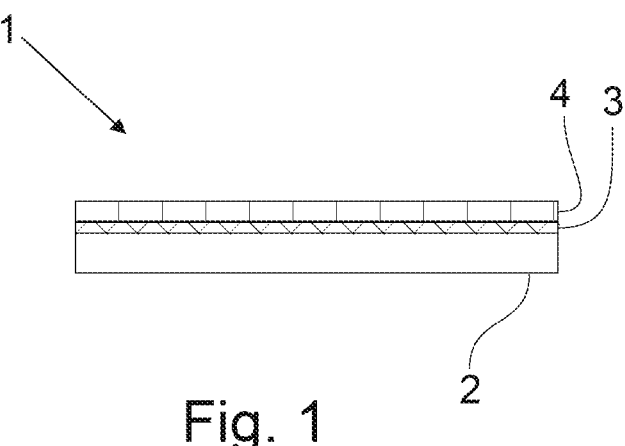
FIG. 1 illustrates schematically a sectional view of an electronic component according to one embodiment.

The present application relates to a dopant complex formed of a dopant ion component encapsulated in a polymer matrix, wherein the dopant ion component is a metal triflate, a metal halide, a metal antimonate, or any combination thereof, and the polymer matrix comprises or consists of hydroxyl-containing polymer.

The present application relates to a dopant complex formed of a dopant ion component encapsulated in a polymer matrix, wherein the dopant ion component is a metal triflate, a metal antimonate, or any combination thereof, and the polymer matrix comprises or consists of hydroxyl-containing polymer.

The present application further relates to an electronic component comprising a transparent layer comprising transparent conductor material in direct contact with a dopant layer, wherein the dopant layer is formed of a dopant complex formed of a dopant ion component encapsulated in a polymer matrix, wherein the dopant ion component is a metal triflate, a metal halide, a metal antimonate, or any combination thereof, and the polymer matrix comprises or consists of hydroxyl-containing polymer.

The present application further relates to an electronic component comprising a transparent layer comprising transparent conductor material in direct contact with a dopant layer, wherein the dopant layer is formed of a dopant complex formed of a dopant ion component encapsulated in a polymer matrix, wherein the dopant ion component is a metal triflate, a metal antimonate, or any combination thereof, and the polymer matrix comprises or consists of hydroxyl-containing polymer.

In one embodiment, the electronic component further comprises a non-conductive base layer. In one embodiment, the electronic component further comprises a non-conductive base layer, wherein the non-conductive base layer, the transparent layer comprising transparent conductor material, and the dopant layer are arranged one on the other in a vertical direction such that the transparent layer comprising transparent conductor material is situated between the non-conductive base layer and the dopant layer.

In one embodiment, the electronic component is an optoelectronic component. In one embodiment, the electronic component is a sensor. In one embodiment, the electronic component is a touch sensor, a photovoltaic component, a heating component, a current conductor, a display component, a display electrode, a lighting component, a light switch, or a light control film.

In one embodiment, the electronic component is formable, flexible, foldable, and/or stretchable, or the electronic component is formable and/or stretchable, or the electronic component is formable.

The present application further relates to the use of a dopant complex, formed of a dopant ion component encapsulated in a polymer matrix, for improving the aging resistance of an electronic component comprising a transparent layer comprising transparent conductor material in direct contact with a dopant layer, by covering the transparent layer comprising transparent conductor material by the dopant layer formed of the dopant complex, wherein the dopant ion component is a metal triflate, a metal halide, a metal antimonate or any combination thereof, and the polymer matrix comprises or consists of hydroxyl-containing polymer.

The present application further relates to the use of a dopant complex, formed of a dopant ion component encapsulated in a polymer matrix, for improving the aging resistance of an electronic component comprising a transparent layer comprising transparent conductor material in direct contact with a dopant layer, by covering the transparent layer comprising transparent conductor material by the dopant layer formed of the dopant complex, wherein the dopant ion component is a metal triflate, a metal antimonate or any combination thereof, and the polymer matrix comprises or consists of hydroxyl-containing polymer.

The inventor surprisingly found out that when a dopant ion component is encapsulated in the polymer matrix thermal stability as well as accelerated environmental stability of the dopant layer could be efficiently increased. Accelerated aging is testing that may use aggravated conditions of heat, humidity, oxygen, sunlight, vibration, etc. to speed up the normal aging processes of items. This may also be called testing based on accelerated environmental conditions. It may be used to help to determine the long-term effects of expected levels of stress within a shorter time, usually in a laboratory by controlled standard test methods. Accelerated aging may be used to estimate the useful lifespan of a product or an item or its shelf life when actual lifespan data is unavailable.

The expression "aging resistance" of an electronic component should be understood in this specification, unless otherwise stated, as meaning the ability of the electronic component to resist electrical and/or optical aging caused by the surrounding environment. The aging resistance may thus be considered e.g. as the ability of the electronic component to withstand changing conditions such as humidity and temperature or their combination. The aging resistance of the electronic component may also be called aging performance of the electronic component.

Electrical aging may be determined by the increase of the sheet resistance (SR) during accelerated environmental conditions. Low sheet resistance may be taken to indicate better electronic component performance and high sheet resistance may be taken to indicate worse electronic component performance. Usually an increase in sheet resistance lower than 10% is taken as a good value for the aging performance of optoelectronic electronic components. The sheet resistances can be measured using a four point probe (by Jandel Engineering Limited) before the accelerated aging process and thereafter using two silver contacts using an Agilent digital multimeter. For each measurement a sample of 18 pieces of 30×30 mm squares can be used.

Optical aging may be determined by the change in light transmission, haze and/or the yellowness index (b*) during accelerated environmental conditions. Light transmission, haze and the yellowness index can be measured by Hunterlab spectrometer in accordance with standard ASTM D1003. In general for electronic components to pass testing, less change in measured transmission, haze and yellowness index (b*) values before and after the tests of accelerated environmental conditions should be achieved.

The dopant complex has the added utility that the dopant ion component does not lose its doping factor even if being encapsulated or complexed with the hydroxyl-containing polymer. I.e. the doping efficiency is not compromised due to the encapsulation.

In one embodiment, the dopant ion component is a combination of a metal triflate, a metal halide, and a metal antimonate. In one embodiment, the dopant ion component is a combination of a metal triflate and a metal halide. In one embodiment, the dopant ion component is a combination of a metal triflate and a metal antimonate. In one embodiment, the dopant ion component is a combination of a metal halide and a metal antimonate.

In one embodiment, the metal triflate is copper triflate, cerium triflate, aluminium triflate, holmium triflate, terbium triflate, nickel triflate, hafnium triflate, or any combination thereof. In one embodiment, the metal triflate is copper triflate or cerium triflate, or their combination.

In one embodiment, the metal halide is gold (III) chloride trihydrate, gold (III) chloride, copper (II) chloride, nickel (II) chloride, aluminium (III) chloride, cerium (III) chloride, copper (I) iodide, iron (III) chloride, antimony (V) chloride, or any combination thereof. In one embodiment, the metal halide is gold (III) chloride.

In one embodiment, the metal antimonate is sodium hexafluoroantimonate, silver hexafluoroantimonate, or any combination thereof. In one embodiment, the metal antimonate is silver hexafluoroantimonate.

In one embodiment, the dopant ion component is selected from a group consisting of copper triflate, cerium triflate, aluminium triflate, holmium triflate, terbium triflate, nickel triflate, hafnium triflate, gold (III) chloride trihydrate, gold (III) chloride, copper (II) chloride, nickel (II) chloride, aluminium (III) chloride, cerium (III) chloride, copper (I) iodide, iron (III) chloride, antimony (V) chloride, sodium hexafluoroantimonate, silver hexafluoroantimonate, or any combination of thereof. In one embodiment, the dopant ion component is selected from a group consisting of copper triflate or cerium triflate, gold chloride, silver hexafluoroantimonate, and any combination thereof.

In one embodiment, the dopant ion component is copper triflate, cerium triflate, aluminium triflate, holmium triflate, terbium triflate, nickel triflate, hafnium triflate, gold (III) chloride trihydrate, gold (III) chloride, copper (II) chloride, nickel (II) chloride, aluminium (III) chloride, cerium (III) chloride, copper (I) iodide, iron (III) chloride, antimony (V) chloride, sodium hexafluoroantimonate, or silver hexafluoroantimonate.

In one embodiment, the dopant ion component is selected from a group consisting of copper triflate, cerium triflate, gold chloride, silver hexafluoroantimonate, and any combination thereof. In one embodiment, the dopant ion component is copper triflate, cerium triflate, gold chloride, silver hexafluoroantimonate, or any combination thereof.

In one embodiment, the dopant ion component is a combination of cerium triflate and gold chloride.

In one embodiment, the dopant ion component is a combination of copper triflate and gold chloride.

The dopant complex may be formed by a twostep process, during which the hydroxyl part of the polymer matrix is reacted with the metal part of the dopant ion component. As an example only, below is presented the complex formation of a copolymer of polyvinyl phenol and polymethyl methacrylate with copper(III)triflate:

$$RO-H + Cu^{2+} \rightarrow CuOR^+ + H^+ \tag{1}$$

$$RO-H + CuOR^+ \rightarrow Cu-(OR)_2 + H^+ \tag{2},$$

wherein the encapsulation of the dopant ion component to the polymer copolymer happens via bonding of phenolic OH group and divalent Cu ion.

The dopant complexes may be produced in the following manner: A dopant ion component solution in 1-5 mM (e.g. 2.5 mM) concentration is dissolved in a solvent or a mixture of solvents containing e.g. ethanol, iso-propanol, acetone, acetic acid, or methyl isobutyl ketone. Polymer concentration used may be 0.1-5%, e.g. 1% or 0.5%. The concentration of the dopant ion component is chosen such that the formed dopant layer may not reduce/decrease/affect the transparency of the transparent layer comprising transparent conductor material and further such that during the accelerated environmental aging, the dopant layer may not result in discoloration of transparent layer comprising transparent conductor material over the extended aging test hours.

In one embodiment, the dopant complex is formed of a dopant ion component complexed with a polymer matrix. In one embodiment, the dopant complex is formed of a dopant ion component bonded to or coupled with the polymer matrix.

In one embodiment, the weight ratio of dopant ion component to the polymer matrix is 1:2-1:5, or 1:3-1:4.

Figure 2:
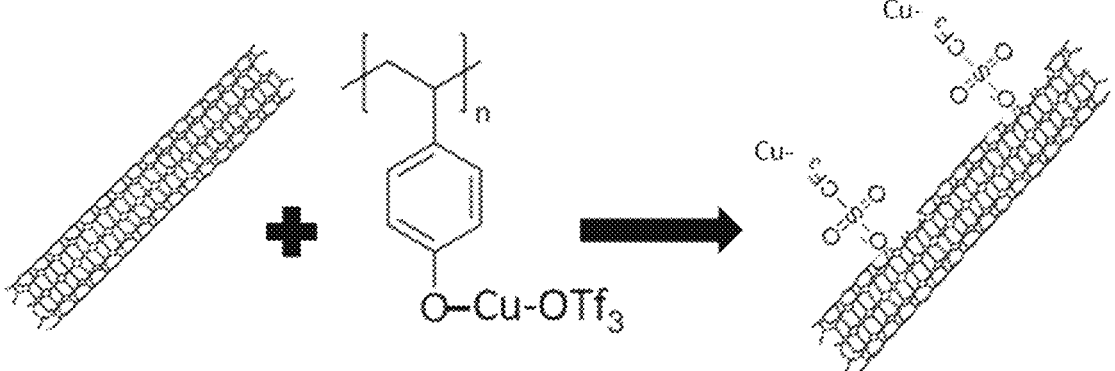
FIG. 2 illustrates when forming a dopant layer formed of a dopant complex on a transparent layer comprising transparent conductor material, e.g. carbon nanotubes, a charge transfer between positively charged carbon nanotubes (CNTs) and a negatively charged dopant complex may take place whereby the dopant complex may be bound to the carbon nanotubes.

When then forming a dopant layer formed of the dopant complex on a transparent layer comprising transparent conductor material, e.g. carbon nanotubes, a charge transfer between positively charged carbon nanotubes (CNTs) and negatively charged dopant complex may take place whereby the dopant complex may be bound to the carbon nanotubes, e.g. through the mechanism presented in FIG. 2.

Encapsulating the dopant ion component in the polymer matrix has the added utility of enabling the formation of a dopant layer on the transparent layer comprising transparent conductor material, wherein the dopant ion components may not be freely available on the surface of the conductor material. As a result of the encapsulation the dopant ion component may not easily react with the surrounding environment, such as moisture or water, that would harm e.g. the electrical performance of the conductor material enhancing its aging. Without being bound to any specific theory why the formed dopant complex is highly stable it may be considered to be a result of its hydrogen bonding nature. For an electronic component the stability of the dopant layer and the protection of the electronic component from aging are desired properties as they may affect the electrical performance and the optical properties of the electronic component.

The expression "hydroxyl-containing polymer" should be understood in this specification, unless otherwise stated, as meaning a polymer that has at least one hydroxyl group, which is an entity with the formula OH. It contains oxygen bonded to hydrogen. I.e. the hydroxyl-containing polymer is a polymer that has at least one hydroxyl group bonded to its structure.

In one embodiment, the hydroxyl-containing polymer is polyvinyl phenol or a copolymer of polyvinyl phenol and polymethyl methacrylate.

The negatively charged hydroxyl groups of the hydroxyl-containing polymer may help to accumulate positive ions. E.g. the polar polyvinyl phenol moieties in the polymer matrix may accelerate binding of the dopant ion components on the polymer, hence initiating dopant encapsulation. The hydroxyl group may then deprotonate when reacting with water or moisture, leaving negatively charged phenoxyl anion on the carbon nanotube surface, which keeps the balance of dopant ion components on carbon nanotube surface. Further, the insertion of e.g. less polar polymethyl methacrylate groups into the polar polyvinyl phenol polymer may suppress water adsorption, and hence improving the aging resistance.

The non-conductive base layer, the transparent layer comprising transparent conductor material, and the dopant layer may be arranged one on the other in a vertical direction such that the transparent layer comprising transparent conductor material is situated between the non-conductive base layer and the dopant layer. The expression that a layer is provided "on" another layer should be understood in this specification, unless otherwise stated, as meaning that a layer is provided or formed to lie on or upon the other layer or is being at least partly embedded therein. E.g. the non-conductive base layer may serve as a carrier or support structure for the transparent layer comprising transparent conductor material and the dopant layer.

In one embodiment, the transparent layer comprising transparent conductor material is in direct contact with the non-conductive base layer and with the dopant layer.

In one embodiment, the non-conductive base layer is formed to be in contact with the transparent layer comprising transparent conductor material on or over the entire surface of the transparent layer comprising transparent conductor material. In one embodiment, the non-conductive base layer is formed to be in contact with the transparent layer comprising transparent conductor material on at least part of the surface of the transparent layer comprising transparent conductor material. In one embodiment, the non-conductive base layer is formed to be in contact with the transparent layer comprising transparent conductor material on only a part of the surface of the transparent layer comprising transparent conductor material. E.g. a "free-standing region" may be formed such that a standalone portion of the transparent layer comprising transparent conductor material that is not in contact with the non-conductive base layer is formed.

The term "comprising" is used in this specification to mean including the feature(s) or act(s) followed thereafter, without excluding the presence of one or more additional features or acts.

It will further be understood that reference to "an" item refers to one or more of those items.

The expression that the base layer is "non-conductive" should be understood in this specification, unless otherwise stated, as meaning that the base layer has a sheet resistance of 10 Mohms/square or higher.

The expression "transparent" should be understood in this specification, unless otherwise stated, as referring to optical transparency of the layer, or the parts and materials thereof in the relevant wavelength range at issue. In other words, "transparent" material or structure refers to a material or structure allowing light, or generally electromagnetic radiation, at such relevant wavelength to propagate through such material or structure. The relevant wavelength range may depend on the application where the layer or the electronic component is to be used. In one embodiment, the relevant wavelength range is the visible wavelength range of about 390 to about 700 nm. In one embodiment, the relevant wavelength range is the infrared radiation wavelength range of about 700 to about 1000 nm.

Further, the transparency of the layer or the parts thereof primarily refers to the transparency in the thickness direction of the layer, or the parts thereof so that in order to be "transparent", sufficient portion of light energy incident on the layer, or a part thereof shall propagate through it in the thickness direction. Such sufficient portion may depend on the application in which the layer or electronic component is to be used. In one embodiment, the transmittance of the layer, or the parts thereof is 20-99.99% of the energy of light incident perpendicularly thereon. In one embodiment, said transmittance is 20% or higher, or 30% or higher, or 40% or higher, or 50% or higher, or 60% or higher, or 70% or higher, or 80% or higher, 90% or higher. The transmittance may be measured according to standard JIS-K7361, ASTM D1003.

In one embodiment, the non-conductive base layer is a non-conductive non-transparent base layer. In one embodiment, the non-conductive base layer is a non-conductive transparent base layer. In one embodiment, the non-conductive base layer is translucent and/or opaque.

In one embodiment, the non-conductive base layer is made of dielectric material. In one embodiment, the material used to form the non-conductive base layer should be suitable for serving as a substrate for the transparent layer comprising transparent conductor material as well as for the dopant layer. In one embodiment, the non-conductive base layer comprises or consists of polymer or glass. In one embodiment, the non-conductive base layer is formed of transparent plastic material. In one embodiment, the material of the non-conductive base layer is selected from a group consisting of polyethylene terephthalate (PET), polycarbonate (PC), polymethyl methacrylate (PMMA), cyclic olefin polymer (COP), triacetate (TAC), cyclic olefin copolymer (COC), poly(vinyl chloride) (PVC), poly(ethylene 2,6-naphthalate (PEN), polyimide (PI), polypropylene (PP), polyethylene (PE), and any combination thereof. In one embodiment, the material of the non-conductive base layer is selected from a group consisting of float glass (comprising of $SiO_2$, $Na_2O$, CaO, MgO), sodalime, aluminosilicate glass, and borosilicate glass. The material of the non-conductive base layer is not, however, limited to these examples.

In one embodiment, the non-conductive base layer has a thickness of 1-5000 µm, or 10-2000 µm, or 30 to 500 µm, or 50-300 µm. However, the non-conductive base layer may also be thicker in some applications.

The transparent conductor material may comprise any appropriate, sufficiently transparent conductor material or any combination of such materials.

In one embodiment, the electronic component comprises a transparent layer comprising or consisting of transparent conductor material. In one embodiment, electronic component comprises a transparent layer of transparent conductor material.

In one embodiment, the transparent conductor material comprises or consists of a conductive high aspect ratio molecular structure (HARMS) network or graphene. In one embodiment, the transparent conductor material comprises or consists of a conductive high aspect ratio molecular structure (HARMS) network. In one embodiment the transparent conductor material comprises or consists of graphene.

A conductive "HARMS" or a "HARM structure" refers to electrically conductive "nanostructures", i.e. structures with one or more characteristic dimensions in nanometer scale, i.e. less or equal than about 100 nanometers. "High aspect ratio" refers to dimensions of the conductive structures in two perpendicular directions being in significantly different magnitudes of order. For example, a nanostructure may have a length which is tens or hundreds times higher than its thickness and/or width. In a HARMS network, a great number of said nanostructures are interconnected with each other to form a network of electrically interconnected molecules. As considered at a macroscopic scale, a HARMS network forms a solid, monolithic material in which the individual molecular structures are disoriented or non-oriented, i.e. are oriented substantially randomly, or oriented. Various types of HARMS networks can be produced in the form of thin transparent layers with reasonable resistivity.

In one embodiment, the conductive HARM structures comprise metal nanowires, such as silver nanowires.

In one embodiment, the conductive HARM network comprises carbon nanostructures. In one embodiment, the carbon nanostructures comprise carbon nanotubes, carbon nanobuds, carbon nanoribbons, or any combination thereof. In one embodiment, the carbon nanostructures comprise carbon nanobuds, i.e. carbon nanobud molecules. The carbon nanobuds or the carbon nanobud molecules, have fullerene or fullerene-like molecules covalently bonded to the side of a tubular carbon molecule. Carbon nanostructures, especially carbon nanobuds, may provide advantages both from electrical, optical (transparency), and mechanical (robustness combined with flexibility and/or deformability) points of view.

The thickness of a transparent layer comprising transparent conductor material may be designed in accordance with the properties of the transparent conductor material, especially the resistivity or conductivity thereof. For example, in the case of the transparent conductor material comprising carbon nanostructures, the transparent layer may have, for example, a thickness of 1-1000 nm. In one embodiment, the thickness of the transparent layer comprising transparent conductor material is 0.1-1000 nm, or 10-100 nm, or 100-500 nm.

In one embodiment, the thickness of the dopant layer is 30-80 nm, or 100-200 nm.

The non-conductive base layer may be provided by an extrusion process and/or a casting process. The non-conductive base layer may be formed of at least two layers of different materials or of the same material. I.e. the non-conductive base layer can be formed of e.g. extruded or coated layers arranged one on the other.

Depending on the material of the transparent layer comprising transparent conductor material, various procedures existing in the art may be used for providing the transparent layer comprising transparent conductor material. In the case of the transparent conductor material comprising carbon nanostructures, such as carbon nanobud molecules, deposition may be carried out, for example, by using the commonly known methods of filtration from gas phase or from liquid, deposition in a force field, or deposition from a solution using spray coating or spin drying. The carbon nanobud molecules can be synthesized, for example, using the method disclosed in WO 2007/057501, and deposited on a substrate, for example, directly from the aerosol flow, e.g. by assistance of e.g. electrophoresis or thermophoresis, or by a method described in Nasibulin et al: "Multifunctional Free-Standing Single-Walled 20 Carbon Nanotube Films", ACS NANO, vol. 5, no. 4, 3214-3221, 2011.

In one embodiment, the transparent conductor material is formed or deposited in a predetermined pattern on the non-conductive base layer. In one embodiment, a predetermined pattern is formed in the transparent layer after having formed or deposited the transparent conductor material on the non-conductive base layer. In said patterning, various processes may be used. In one embodiment, a laser process, an etching process, direct printing, a mechanical process, a burning process, or any combination thereof, is used for the patterning. In one embodiment, the laser process is laser ablation. In one embodiment, the etching process is a photolithographic process. In one embodiment, the pattern is formed simultaneously or after the transparent layer comprising transparent conductor material is formed or deposited on the non-conductive base layer.

In one embodiment, covering the transparent layer comprising transparent conductor material at least partly with a dopant layer is carried out by using at least one of the following processes: dip coating, slot die coating, meniscus coating, roller coating, screen printing, gravure coating, flexo coating, offset coating, knife coating, physical vapor deposition.

In one embodiment, at least one metallic contact pad is provided. In one embodiment, at least one metallic contact pad is provided on the transparent layer comprising transparent conductor material. In one embodiment, the at least one metallic contact pad is provided by using screen printing or ink-jet printing. In one embodiment, the at least one metallic contact pad comprises silver, gold, copper or any combination thereof.

The embodiments described hereinbefore may be used in any combination with each other. Several of the embodiments may be combined together to form a further embodiment. A dopant complex, an electronic component, or a use, to which the application is related, may comprise at least one of the embodiments described hereinbefore. It will be understood that the benefits and advantages described herein may relate to one embodiment or may relate to several embodiments. The embodiments are not limited to those that solve any or all of the stated problems or those that have any or all of the stated benefits and advantages. It will further be understood that reference to "an" item refers to one or more of those items. The term "comprising" is used in this specification to mean including the feature(s) or act(s) followed thereafter, without excluding the presence of one or more additional features or acts.

The electronic component as described in this application has the added utility of improved aging resistance as a result of the conductor material being covered or protected by a dopant layer formed of the dopant complex. The dopant complex as described in this application has the added utility of the polymer matrix embedding the dopant ion components such that the dopant ion components are not freely available on the surface of the transparent layer comprising transparent conductor material hindering them from reacting with humidity and moisture of the surrounding environment. Further, the dopant complex as described in this application has the added utility of decreasing hygroscopy and hence decreasing reactivity of the dopant ion component to moisture and humidity. The dopant complex as described in this application has the added utility of showing improved stability in even high temperature of e.g. 120° C. for an extended testing period, such as 2000 h.

EXAMPLES

Reference will now be made in detail to the described embodiments, examples of which are illustrated in the accompanying drawings.

The description below discloses some embodiments in such a detail that a person skilled in the art is able to utilize the dopant complex and electronic component based on the disclosure. Not all steps of the embodiments are discussed in detail, as many of the steps will be obvious for the person skilled in the art based on this specification.

For reasons of simplicity, item numbers will be maintained in the following exemplary embodiments in the case of repeating components.

FIG. 1 illustrates schematically a sectional view of an electronic component 1 according to one embodiment described in this description. From FIG. 1 one can see an electronic component 1 comprising a non-conductive base layer 2, a transparent layer comprising transparent conductor material 3, and a dopant layer 4. The non-conductive base layer 2, the transparent layer comprising transparent conductor material 3, and the dopant layer 4 are arranged one on the other in a vertical direction. The transparent layer comprising transparent conductor material 3 is situated between the dopant layer 4 and non-conductive base layer 2. The transparent layer comprising transparent conductor material 3 is in direct contact with the dopant layer 4 and the non-conductive base layer.

Example 1—Producing Dopant Complexes and Electronic Components

In this example different sensors were produced as the electronic components. The sensors comprised a non-conductive base layer, a transparent layer comprising transparent conductor material, and a dopant layer.

The materials used for producing dopant complexes and sensors are presented in the below table:

| non-conductive base layer | transparent polycarbonate |
|---|---|
| transparent layer comprising transparent conductor material | carbon nanobud molecules (CNB) |
| dopant layer | polymer matrix: copolymer of polyvinyl phenol and polymethyl methacrylate; dopant ion component: silver hexafluoroantimonate, gold (III) chloride, cerium (III) chloride, or copper (II) chloride |

In addition, comparative examples were made by preparing otherwise similar sensors but where the dopant ion component was not encapsulated in a polymer matrix but used as a bare dopant layer.

The materials used for producing the comparative sensors are presented in the below table:

| non-conductive base layer | transparent polycarbonate |
|---|---|
| transparent layer comprising transparent conductor material | carbon nanobud molecules (CNB) |
| dopant layer | dopant ion component: silver hexafluoroantimonate, gold (III) chloride, cerium (III) chloride, or copper (II) chloride |

First, the dopant layer was produced of the dopant complex formed of the dopant ion component encapsulated in the polymer matrix. The dopant ion components used in this example were silver hexafluoroantimonate, gold (III) chloride, cerium (III) chloride, or copper (II) chloride and the polymer matrix was the copolymer of polyvinyl phenol and polymethyl methacrylate. In the comparative examples, no polymer matrices were used to encapsulate the dopant ion components.

The dopant complexes were prepared in the following manner: A dopant ion component solution in 2.5 mM concentration was dissolved in a solvent mixture of acetone:

acetic acid:isopropanol in the ratio of 20:25:55. The polymer concentration used was 0.5%.

A transparent layer comprising transparent conductor material, in this example carbon nanobuds, was provided. The transparent layer was provided on the non-conductive base layer and then a dopant layer was arranged on the transparent layer comprising transparent conductor material.

In order to evaluate the behavior of the formed sensors in changing climatic or environmental conditions such as humidity and temperature, accelerated aging test was conducted, wherein the sensors aging process was carried out in the laboratory by keeping the sensors at a temperature of 85° C. and at 85% relative humidity (RH) for 100 hours. The apparatus used was an environmental chamber of the model Weiss WKL 100. The sheet resistances (ohm/square) were measured for each of the above sensors. The sheet resistance measurements were carried out after the sensors were subjected to accelerated aging, the sheet resistances were measured using four point probe (by Jandel Engineering Limited) before the accelerated aging and thereafter using the two silver contacts using an Agilent digital multimeter. For each measurement a sample of 18 pieces of 30×30 mm carbon nanobud squares were used. The results can be seen in the below table:

| Dopant ion component | Polymer matrix | Sheet resistance increase (%) | |
| --- | --- | --- | --- |
| | | bare dopant ion component | dopant ion component + polymer matrix |
| silver hexafluoro-antimonate | copolymer of polyvinyl phenol and polymethyl methacrylate | 80 | 45 |
| gold (III) chloride | | 55 | 29 |
| cerium (III) chloride | | 38 | 22 |
| copper (II) chloride | | 25 | 10 |

It can be seen from the above table, that the sensors formed of dopant ion components complexed with the copolymer of polyvinyl phenol and polymethyl methacrylate have lower sheet resistance increase, hence they have greater aging resistance compared to the sensors formed with bare dopant ion components.

Example 2—Producing Dopant Complexes and Sensors

In accordance with the procedure described above in example 1 further sensors were produced as presented in the below table.

In order to evaluate the behavior of the formed sensors in changing conditions such as humidity and temperature, accelerated aging test was conducted, wherein the sensors aging process was carried out in the laboratory by keeping the sensors at a temperature of 85° C. and at 85% relative humidity (RH) or at 120° C. for 2000 hours. The apparatus used was an environmental chamber of the model Espec SH-241 and heating oven of the model Memmert Universal oven UN30-1060.

The sheet resistances (ohm/square) were measured for each of the sensors. The sheet resistance measurements were carried out after the sensors were subjected to accelerated aging. The sheet resistances were measured using four point probe (by Jandel Engineering Limited) before the accelerated aging and thereafter using the two silver contacts using an Agilent digital multimeter. For each measurement a sample of 18 pieces of 30×30 mm CNB squares were used. The results can be seen in the below table:

| Dopant ion component | Polymer | Sheet resistance increase (%) | | | |
| --- | --- | --- | --- | --- | --- |
| | | bare dopant ion component | | dopant ion component + polymer matrix | |
| | | 85° C./ 85% RH | 120° C. | 85° C./ 85% RH | 120° C. |
| cerium triflate | a copolymer of polyvinyl phenol and polymethyl methacrylate | 50 | 20 | 25 | 10 |
| copper triflate | | 20 | 5 | 6 | −5 |
| aluminum triflate | | 25 | 10 | 10 | −3 |
| holmium triflate | | 40 | 15 | 25 | 10 |
| terbium triflate | | 40 | 15 | 25 | 10 |
| nickel triflate | | 30 | 10 | 20 | 5 |
| hafnium triflate | | 50 | 20 | 30 | 10 |

It can be seen from the above table, that the sensors formed of dopant ion components complexed with copolymer of polyvinyl phenol and polymethyl methacrylate have lower sheet resistances, hence they have greater aging resistance compared to the sensors formed with bare dopant ion components.

Example 3—Producing a Dopant Complex and an Electronic Component

In this example 5 mM of copper triflate was mixed with 1% of a copolymer of polyvinyl phenol and polymethyl methacrylate (PVP-co-PMMA) in a mixture of solvents, containing 100 ml of acetone, 150 ml of acetic acid and 250 ml of isopropanol. The complexation reaction resulted in the copper triflate dopant ion component being coupled with the polymer matrix. The resulting dopant complex was obtained as a clear dispersion.

An electronic component, in this example a sensor, was prepared on a 250 μm polycarbonate substrate as the non-conductive base layer with a layer of carbon nanobuds deposited thereon, and then the dopant layer was dip coated on top of carbon nanobud layer. The thickness of the dopant layer is about 50 nm. Acrylic based topcoat layer of about 400 nm was deposited on top of the dopant layer.

The measured sheet resistance of the sensor was 35 ohms/square. The optical values measured for the sensor before and after the reliability tests were performed. The results are presented in the below table:

| Reliability test conditions | Sample condition | Transmittance at 550 nm (% T) | Haze | b* (yellowness index) |
| --- | --- | --- | --- | --- |
| 120° C. accelerated thermal reliability tests | Before reliability tests | 70.52 | 0.27 | 1.45 |
| | After 2000 h at 120° C. | 70.75 | 0.54 | 2.45 |

-continued

| Reliability test conditions | Sample condition | Transmittance at 550 nm (% T) | Haze | b* (yellowness index) |
|---|---|---|---|---|
| | reliability testing | | | |
| 85° C. & 85% RH accelerated environmental reliability tests | Before reliability tests | 70.23 | 0.14 | 0.58 |
| | After 2000 h at 85° C./ 85% RH reliability testing | 70.39 | 0.56 | 1.47 |

As can be seen from the above table, the difference in values measured before and after reliability tests was rather small in terms of values reported in state-of-the-art opto-electronic sensors.

It is obvious to a person skilled in the art that with the advancement of technology, the basic idea may be implemented in various ways. The embodiments are thus not limited to the examples described above; instead they may vary within the scope of the claims.

The invention claimed is:

1. A dopant complex formed of a dopant ion component encapsulated in a polymer matrix, wherein the dopant ion component is a metal triflate being copper triflate, cerium triflate, aluminium triflate, holmium triflate, terbium triflate, nickel triflate, or hafnium triflate, a metal antimonate being sodium hexafluoroantimonate, or any combination thereof, and the polymer matrix comprises or consists of a hydroxyl-containing polymer, wherein the dopant complex is formed of the dopant ion component coupled with the polymer matrix, and wherein the hydroxyl-containing polymer of the polymer matrix is bound to a metal part of the dopant ion component.

2. The dopant complex of claim 1, wherein the hydroxyl-containing polymer is polyvinyl phenol or a copolymer of polyvinyl phenol and polymethyl methacrylate.

3. An electronic component comprising a transparent layer comprising transparent conductor material in direct contact with a dopant layer, wherein the dopant layer is formed of a dopant complex formed of a dopant ion component encapsulated in a polymer matrix, wherein the dopant ion component is a metal triflate being copper triflate, cerium triflate, aluminium triflate, holmium triflate, terbium triflate, nickel triflate, or hafnium triflate, a metal antimonate being sodium hexafluoroantimonate, or any combination thereof, and the polymer matrix comprises or consists of a hydroxyl-containing polymer, wherein the dopant complex is formed of the dopant ion component coupled with the polymer matrix, and wherein the hydroxyl-containing polymer of the polymer matrix is bound to a metal part of the dopant ion component.

4. The electronic component of claim 3, wherein the electronic component further comprises a non-conductive base layer, wherein the non-conductive base layer, the transparent layer comprising transparent conductor material, and the dopant layer are arranged one on the other such that the transparent layer comprising transparent conductor material is situated between the non-conductive base layer and the dopant layer.

5. The electronic component of claim 3 wherein the hydroxyl-containing polymer is polyvinyl phenol or a copolymer of polyvinyl phenol and polymethyl methacrylate.

6. The electronic component of claim 3, wherein the transparent conductor material comprises or consists of a conductive high aspect ratio molecular structure (HARMS) network or graphene.

7. The electronic component of claim 3, wherein the electronic component is formable, flexible, foldable, and/or stretchable, or wherein the electronic component is formable and/or stretchable, or wherein the electronic component is formable.

8. The electronic component of claim 3, wherein the electronic component comprises a touch sensor, a photovoltaic component, a heating component, a current conductor, a display component, a display electrode, a lighting component, a light switch, or a light control film.

9. The electronic component of claim 3, wherein the dopant layer is formed of a dopant complex only formed of a dopant ion component encapsulated in a polymer matrix.

10. A method of improving the aging resistance of an electronic component comprising a transparent layer comprising transparent conductor material in direct contact with a dopant layer formed of a dopant complex including a dopant ion component encapsulated in a polymer matrix, comprising:

covering the transparent layer comprising transparent conductor material by with the dopant layer formed of the dopant complex, wherein the dopant ion component is a metal triflate being copper triflate, cerium triflate, aluminium triflate, holmium triflate, terbium triflate, nickel triflate, or hafnium triflate, a metal antimonate being sodium hexafluoroantimonate, or any combination of thereof, and the polymer matrix comprises or consists of a hydroxyl-containing polymer, wherein the dopant complex is formed of the dopant ion component coupled with the polymer matrix, and the hydroxyl-containing polymer of the polymer matrix is reacted with a metal part of the dopant ion component.

11. The method of claim 10, wherein the electronic component further comprises a non-conductive base layer, wherein the method includes arranging the non-conductive base layer, the transparent layer comprising transparent conductor material, and the dopant layer one on the other such that the transparent layer comprising transparent conductor material is situated between the non-conductive base layer and the dopant layer, and such that the transparent layer comprising transparent conductor material is in direct contact with the dopant layer.

12. The method of claim 10, wherein the hydroxyl-containing polymer is polyvinyl phenol or a copolymer of polyvinyl phenol and polymethyl methacrylate.

\* \* \* \* \*